United States Patent [19]

Ueda

[11] Patent Number: 4,602,709

[45] Date of Patent: * Jul. 29, 1986

[54] COLLECTING CHUTE FOR WEIGHED ARTICLES DISCHARGED FROM AUTOMATIC WEIGHING SYSTEM

[75] Inventor: Kenji Ueda, Kyoto, Japan

[73] Assignee: Kabushiki Kaisha Ishida Koki Seisakusho, Kyoto, Japan

[ * ] Notice: The portion of the term of this patent subsequent to Dec. 17, 2002 has been disclaimed.

[21] Appl. No.: 522,565

[22] Filed: Aug. 12, 1983

[30] Foreign Application Priority Data

Nov. 13, 1982 [JP] Japan .............................. 57-171851[U]

[51] Int. Cl.⁴ ...................... B65G 11/00; G01G 19/32
[52] U.S. Cl. ....................................... 193/2 R; 177/25
[58] Field of Search ............................. 177/25, 58, 59; 193/2 R, 2 A

[56] References Cited

U.S. PATENT DOCUMENTS

| | | | |
|---|---|---|---|
| 4,399,880 | 8/1983 | Konishi | 177/25 |
| 4,467,880 | 8/1984 | Minamida et al. | 177/25 |
| 4,558,774 | 12/1985 | Mikami | 193/2 R |

Primary Examiner—Joseph F. Peters, Jr.
Assistant Examiner—Mary Beth O. Jones
Attorney, Agent, or Firm—Staas & Halsey

[57] ABSTRACT

A collecting chute for collecting weighed articles discharged from an automatic weighing system divided into left and right sections. Each section has an inner article receiving portion and an outer article receiving portion. Two article discharge portions are provided side-by-side at the bottom end of each section. The left and right sections each include an upper, outer chute and a contiguous lower, outer chute, an upper, inner chute and a contiguous lower, inner chute, and a discharge chute contiguous to the lower, outer chute. The left lower, inner chute has an outlet which extends solely into the right lower, outer chute, and the right lower, inner chute has an outlet which extends solely into the left, lower outer chute, thereby communicating the left and right lower, inner chutes with the right and left discharge chutes, respectively. The upper, outer chutes and the upper, inner chutes are capable of being disassembled into plural component parts.

7 Claims, 5 Drawing Figures

COLLECTING CHUTE FOR WEIGHED ARTICLES DISCHARGED FROM AUTOMATIC WEIGHING SYSTEM

CROSS REFERENCE TO RELATED APPLICATION

The subject matter of the present application is related to the subject matter of co-pending U.S. patent application Ser. No. 522,564, filed Aug. 12, 1983 and assigned to the assignee of the present application.

BACKGROUND OF THE INVENTION

This invention relates to a collecting chute for a combinatorial weighing-type automatic weighing system and, more particularly, to a collecting chute composed of a plurality of component parts capable of being disassembled, and having two article discharge sections.

A combinatorial automatic weighing system known in the art operates by introducing articles into a plurality of weighing hoppers of corresponding weighing machines arranged in a circle, computing combinations of weight values obtained from the weighing machines, selecting the combination giving a total combined weight value equal or closest to a preset target value, and discharging the weighed articles solely from the weighing hoppers of weighing machines corresponding to the selected combination. In order to gather the weighed articles discharged from the selected weighing hoppers and deliver them to a packaging machine or the like, the automatic weighing system is equipped with a collecting chute disposed below the weighing hoppers. The collecting chute has the shape of an inverted cone for receiving the articles discharged from the weighing hoppers.

To raise the processing capacity of the automatic weighing system per unit time, the interval between the article discharge cycles is shortened. This means that when one batch of the articles has been discharged into the aforementioned collecting chute, the next batch will follow shortly thereafter, so that the distance between the two batches sliding downwardly along the chute becomes quite small. For short discharge intervals, successively discharged article batches will often mix within the chute, making it difficult for the packaging machine supplied with the articles to package them into discrete quantities each of which must have a certain fixed weight. An alternative arrangement aimed at solving this problem is to steepen the incline of the collecting chute walls along which the articles slide in order to hasten the rate at which the articles pass through the chute. The inevitable result of this expedient, however, is to enlarge the vertical dimension of the collecting chute and, hence, the overall height of the weighing system.

Figure 1:
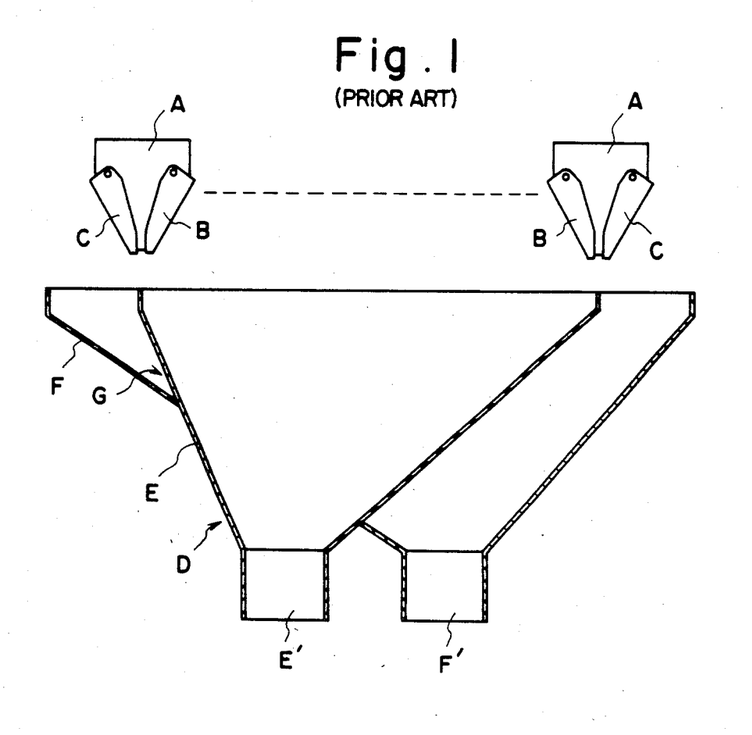
FIG. 1 is a schematic, longitudinal sectional view of a prior-art collecting chute.

Still another attempt at a solution to the foregoing problem is the arrangement illustrated in FIG. 1. Here, each weighing hopper, designated as A, in the aforementioned circular array of weighing hoppers is provided with an inwardly opening gate B and an outwardly opening gate C ("inwardly" meaning toward the center of the chute arrangement, "outwardly" meaning away from the center). Further, the collecting chute, indicated generally as D, is composed of an inner chute E for receiving weighed articles discharged from the inwardly opening gates B of the respective weighing hoppers A, and an outer chute F for receiving weighed articles discharged from the outwardly opening gates C of the respective weighing hoppers A. The chutes E and F intersect each other and terminate in side-by-side discharge ports E' and F' located at their lower ends. With this arrangement, weighed articles discharged alternatingly from the gates B and C of the respective weighing hoppers A slide downwardly along two discharge routes so that a batch of articles obtained at the end of one weighing cycle is separated completely from a batch obtained at the end of the next weighing cycle. Thus the article batches are delivered to the packaging machine one after another with good separation.

Nevertheless, the collecting chute D shown in FIG. 1 is disadvantageous in certain respects. Specifically, as is evident from the drawing, the sloping walls of the inner and outer chutes E and F along which the articles slide do not have the same angle of inclination, and the articles do not slide equal distances in exiting from the discharge ports E' and F'. Consequently, the articles will pass through one chute faster than the other, so that a disparity arises in the discharge rate of each chute. In addition, depending on the placement of the circumferentially arrayed weighing hoppers, the articles discharged into a chute by some weighing hoppers will pass through the chute faster than articles discharged into the same chute by other weighing hoppers. Furthermore, a narrow passage is formed at the point G where the inner chute E intersects the surface of the outer chute F along which the articles slide. The downward progress of articles that fall into this narrow passage is slowed substantially, making it difficult to raise processing capacity.

SUMMARY OF THE INVENTION

Accordingly, an object of the present invention is to provide a chute for collecting weighed articles discharged from an automatic weighing system, wherein it is possible to raise the processing capacity per unit time.

Another object of the present invention is to provide a chute for collecting weighed articles discharged from an automatic weighing system, which chute can be readily attached to and detached from the main body of the weighing system.

According to the present invention, the foregoing objects are attained by providing a collecting chute for collecting weighed articles, which chute is divided into left and right sections and has an inner article receiving portion defining an opening and an outer article receiving portion defining an opening at the upper end thereof, and two article discharge portions provided side-by-side at the bottom end thereof. The left and right sections each include an upper, outer chute and a contiguous lower, outer chute; an upper, inner chute and a contiguous lower, inner chute; and a discharge chute contiguous to the lower, outer chute. The left lower, inner chute has an outlet which extends solely into the right lower, outer chute, and the right lower, inner chute has an outlet which extends solely into the left, lower outer chute, thereby communicating the left and right lower, inner chutes with the right and left discharge chutes, respectively.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

Figure 2:
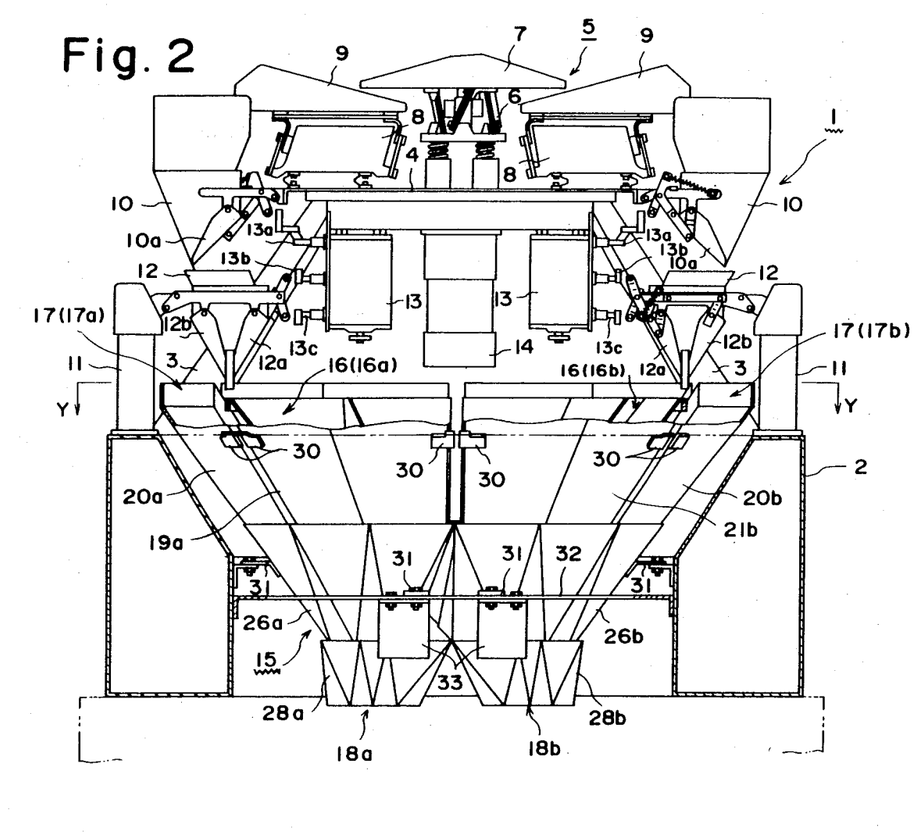
FIG. 2 is a partially cut away longitudinal sectional view, seen from the front, of a weighing system provided with a collecting chute according to the present invention.

With reference to FIG. 2, numeral 1 denotes the main body of a weighing system, and numeral 2 denotes a base for supporting the main body 1. A supporting platform 4 is supported above the base 2 at the central portion thereof by a plurality of support legs 3 . . . 3 the lower ends of which are affixed to the base. Provided on the supporting platform 4 is a feeding unit 5 for feeding articles in distributive fashion. The feeding unit 5 includes a dispersing table 7 mounted centrally on the supporting platform 4 through a vibrator 6, a plurality of radially extending supply troughs 9 . . . 9 mounted on the supporting platform 4 through respective vibrators 8 . . . 8, the inner end of each supply trough 9 underlying the periphery of the dispersing table 7, and pool hoppers 10 . . . 10, equal in number to the supply troughs, attached to the periphery of the supporting platform 4 so as to underlie the outer ends of corresponding ones of the supply troughs 9 . . . 9. Weghing machines 11 . . . 11, equal in number to the pool hoppers 10 . . . 10, are disposed in a circular array on the base 2. A weighing hopper 12 is attached to each weighing machine 10, the weighing hoppers 12 . . . 12 being situated below corresponding ones of the pool hoppers 10 . . . 10. Each pool hopper 10 is equipped with a single gate 10a for charging articles, contained in the hopper, into the underlying weighing hopper 12. Each weighing hopper 12 is equipped with two gates, namely an inwardly opening gate 12a and an outwardly opening gate 12b where "inwardly" means toward the center of the weighing system main body and "outwardly" means away from the center. A hopper actuating device 13 is provided for each cooperating pair of pool hoppers 10 and weighing hoppers 12, the latter underlying the former as mentioned above. Numeral 14 designates a motor for operating each of the hopper actuating devices 13 . . . 13 through gears, not shown. The hopper actuating devices 13 . . . 13 and motor 14 depend from the underside of the supporting platform 4. Each hopper actuating device 13 is equipped with push-rods 13a, 13b, 13c. When thrust outwardly, the push-rod 13a opens the gate 10a of the pool hopper 10, and the push-rods 13b, 13c open the gates 12a, 12b of the weighing hopper 12, respectively.

Numeral 15 denotes a collecting chute in accordance with the present invention. The collecting chute 15, fitted on the base 2 below the array of weighing hoppers 12 . . . 12, is of substantially inverted conical shape. The upper part of the collecting chute 15 is provided with a substantially circular inner receiving portion 16 defining a substantially circular opening for receiving weighed articles discharged from the inwardly opening gates 12a . . . 12a of the weighing hoppers 12 . . . 12, and with an annular outer receiving portion 17 defining a substantially annular opening around the outer periphery of the inner receiving portion 16, for receiving weighed articles discharged from the outer opening gates 12b . . . 12b of the weighing hoppers 12 . . . 12. The lower part of the collecting chute 15 is provided with two side-by-side discharge portions 18a, 18b for supplying an underlying packaging machine or bucket conveyor (neither of which is shown) with weighed articles.

Figure 3:
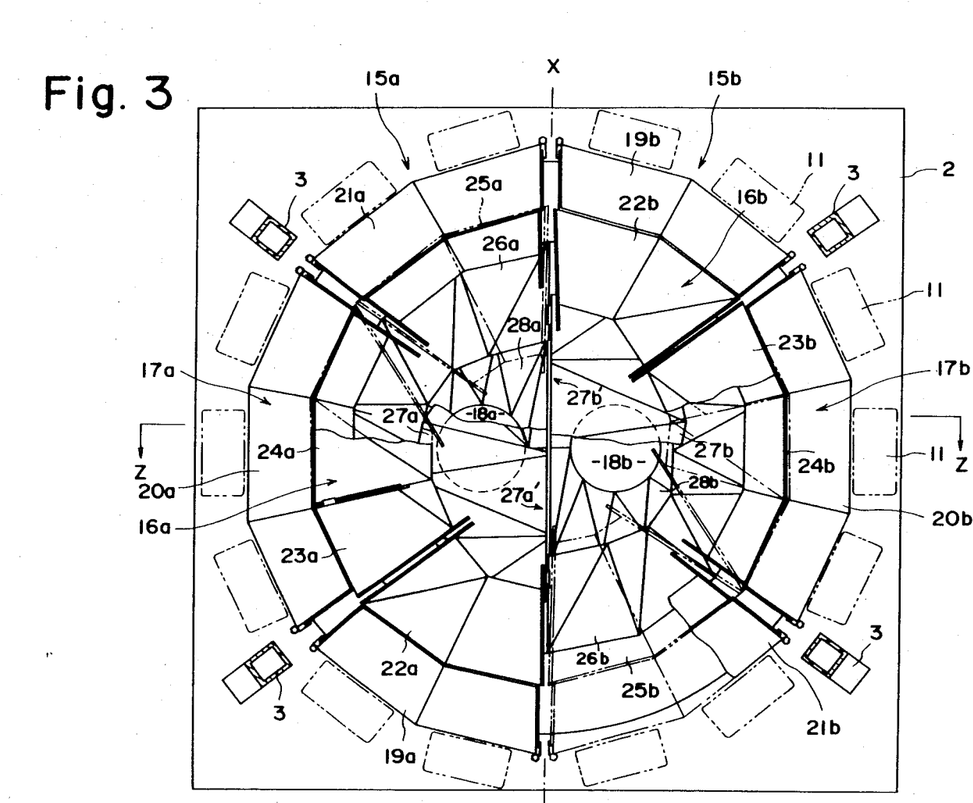
FIG. 3 is a transverse sectional view taken along line Y—Y of FIG. 2.
Figure 4:
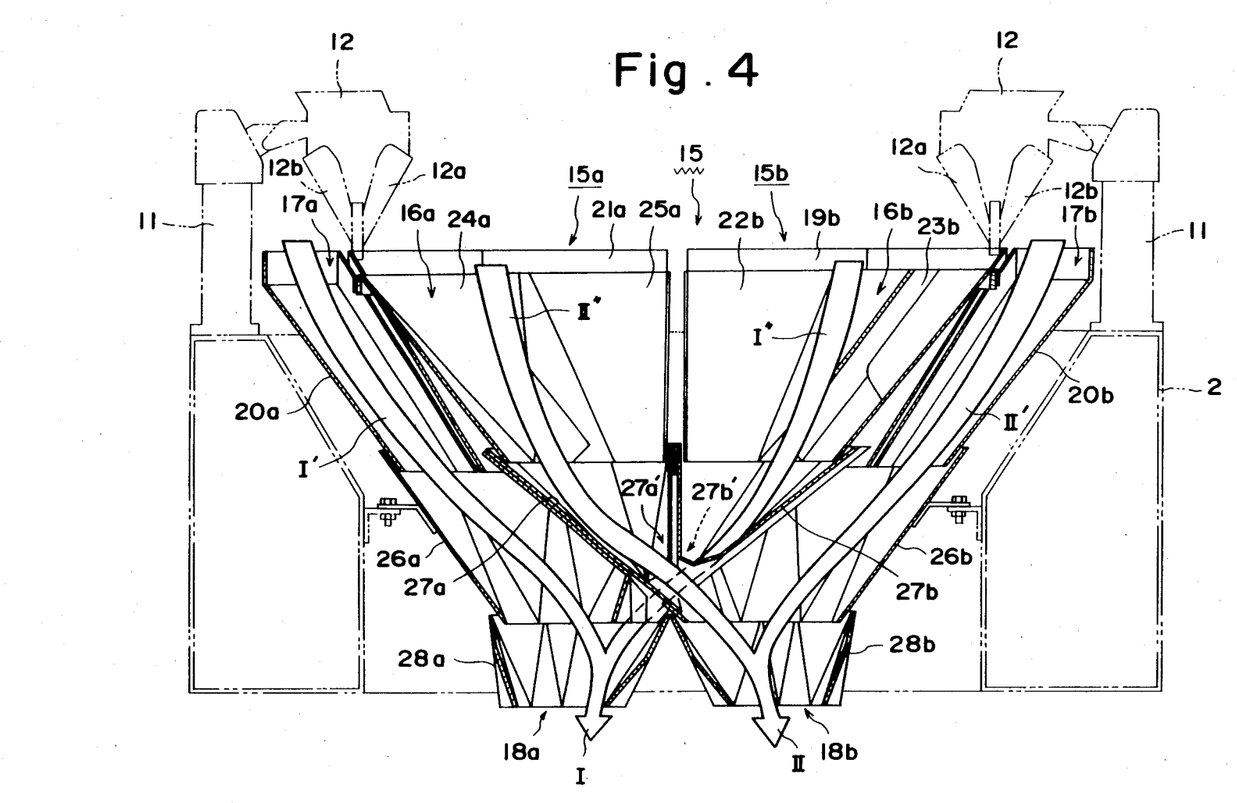
FIG. 4 is a longitudinal sectional view, seen from the front, taken along line Z—Z of FIG. 3.
Figure 5:
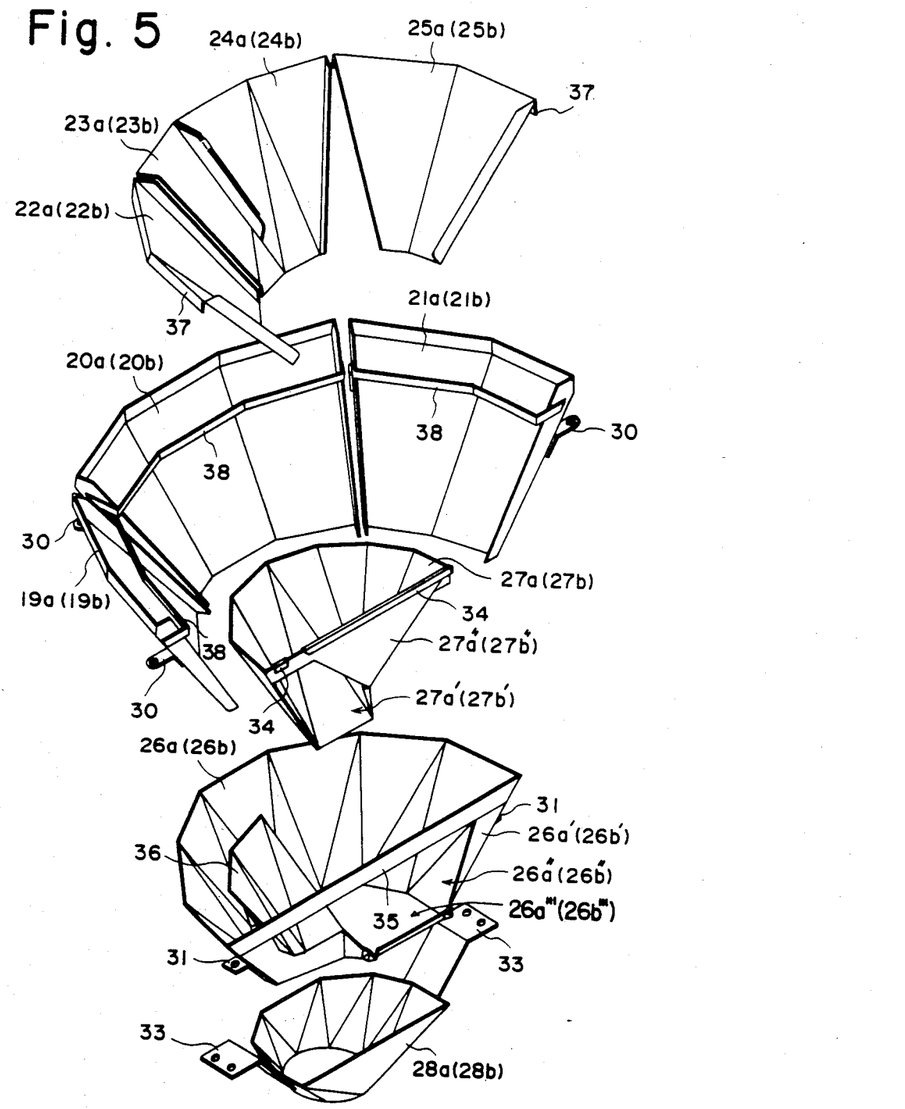
FIG. 5 is a perspective view showing each of the components constituting the left half of a collecting chute according to the present invention.

The collecting chute 15 having the inner and outer receiving portions 16, 17 at the upper part thereof and the two discharge portions 18a, 18b at the lower part thereof is constructed in the following manner by combining a number of component parts, as shown in FIGS. 3 through 5. Specifically, the collecting chute 15 is divided into symmetrical right and left sections or first and second collecting chutes 15a, 15b by a longitudinal partitioning plane X—X, as shown in FIG. 3. In the illustrated embodiment, the weighing system is provided with fourteen weighing machines 11 . . . 11 and, hence, with fourteen weighing hoppers 12 . . . 12 for corresponding ones of the weighing machines. Accordingly, the right and left sections 15a, 15b of the collecting chute 15 each correspond to seven weighing hoppers. The left section or left upper, outer chute semi-assembly 15a (and, likewise, the right section or right upper, outer chute semi-assembly 15b), comprises three upper, outer chutes or chute components 19a, 20a and 21a (19b, 20b and 21b) having a sloping trough-like configuration and forming a left-half section 17a (right-half section 17b) of the annular outer receiving portion 17 by being arranged along a semicircle; four upper, inner chutes or chute components 22a, 23a, 24a and 25(a) (22b, 23b, 24b, 25b) have a sloping trough-like configuration and form a left-half section or left upper, inner chute assembly 16a (right-half section or right upper, inner chute assembly 16b) of the circular inner receiving portion 16 by being arranged along a semicircle; a lower, outer chute 26a (26b) contiguous to the lower end portions of the upper, outer chutes; a lower, inner chute 27a (27b) contiguous to the lower end portions of the upper, inner chutes; and a discharge chute 28a (28b) constitute the article discharge portion 18a (18b) and are contiguous to the lower end portion of the lower, outer chute 26a (26b). As shown in FIG. 5, the lower, our chutes 26a, 26b of the left and right sections 15a, 15b have side walls or confronting sides 26a', 26b' along the dividing plane X—X which are provided with wide openings 26a", 26b" respectively, and lower end portions forming through-holes 26a''', 26b''', respectively. Likewise, the lower, inner chutes 27a, 27b, which are situated inwardly of the lower, outer chutes 26a, 26b, have side walls 27a", 27b" along the dividing plane X—X, these side walls being provided with outlets 27a', 27b', respectively. The arrangement is such that the outlet 27a' of the lower, inner chute 27a belonging to the left section 15a extends into the lower, outer chute 26b of the right section 15b through the openings or through holes 26a", 26b" of the lower, outer chutes 26a, 26b, and such that the outlet 27b' of the lower, inner chute 27b belonging to the right section 15a extends into the lower, outer chute 26a of the left section 15b through the openings or through holes 26b", 26a" of the lower, outer chutes 26b, 26a, respectively. Thus, the left and right lower, inner chutes 27a, 27b are communicated with the right and left discharge chutes 28b, 28a, respectively.

With the foregoing construction, first and second discharge routes I, II are formed with the collecting chute 15, as shown in FIG. 4. The first discharge route I is constituted by merging routes I', I''. The route I' extends from the outer receiving portion 17 of the left-half section 17a belonging to the left section 15a, to the left discharge chute 28a (discharge portion 18a) upon passing through the upper, outer chutes 19a-21a and the lower, outer chute 26a of the left section 15a. The route I'' extends from the inner receiving portion 16 of the right-half section 16b belonging to the right section 15b, to the left discharge chute 28a (discharge portion 18a) upon passing through the upper, inner chutes 22b-25b and the lower, inner chute 27b of the right section 15b. The second discharge route II is constituted by merging routes II', II''. The route II' extends from the outer receiving portion 17 of the right-half section 17b belonging to the right section 15b, to the right discharge chute 28b (discharge portion 18b) upon passing through the upper, outer chutes 19b-21b and the lower, outer chute 26b of the right section 15b. The route II'' extends from the inner receiving portion 16 of the left-half section 16a belonging to the left section 15a, to the right discharge chute 28b (discharge portion 18b) upon passing through the upper, inner chutes 22a-25a and the lower, inner chute 27a of the left section 15a.

The upper, outer chutes 19a through 21a and 19b through 21b are attached to the base 2 by means of mounting members 30 fixedly secured to the outer side of each chute. As shown in FIG. 2, the lower, outer chutes 26a, 26b are attached to the base 2, and to a mounting bar 32 bridging the base, by means of mounting members 31 fixedly secured to the outer side of each chute. The discharge chutes 28a, 28b are attached to the mounting bar 32 by mounting members fixedly secured to the outer side of each discharge chute. As shown in FIG. 5, the lower, inner chute 27a (27b) is attached to the lower, outer chute 26a (26b) by engaging a bent portion 34, which is provided on the upper edge of the side wall 27a'' (27b'') of the chute 27a (27b), with a cross beam 35 provided on the upper edge of the side wall 26a' (26b') of the lower, outer chute 26a (26b), and by seating the underside of the lower, inner chute 27a (27b) on a supporting plate 36 integrally formed with the lower, outer chute 26a (26b). The upper, inner chutes 22a through 25a (22b through 25b) are supported on the upper, outer chutes 19a through 21a (19b through 21b) by engaging a curved portion 37, which is formed along the upper edge of each upper, inner chute, with a strap-like engaging member 38 fixedly secured to each of the upper, outer chutes 19a through 21a (19b through 21b), and by letting the lower end portion of each upper, inner chute rest upon the inner wall surface of the lower, inner chute 27a (27b) at the upper portion thereof.

In operation, articles to be weighed are distributively supplied from the distributing table 7 of the weighing system 1 to the weighing hoppers 12 . . . 12 of the weighing machines 11 . . . 11 through the troughs 9 . . . 9 and pool hoppers 10 . . . 10. The articles in each weighing hopper are weighed by the corresponding weighing machines. The weighing system then computes combinations of the measured weights, selects the combination giving a total combined weight value equal or closest to a predetermined target weight, and activates the hopper actuating devices 13 . . . 13 corresponding to the weighing hoppers 12 . . . 12 of the weighing machines which belong to the selected combination. Each designated actuating device 13 responds by opening gate 12a or 12b of the corresponding weighing hopper 12. Consequently, only the articles contained in the corresponding weighing hoppers 12 . . . 12 are discharged into the underlying collecting chute 15. Those of the weighing hoppers 12 . . . 12 which have released their articles are immediately resupplied with articles to prepare for the next weighing cycle. The weighing system 1 does this by causing the actuating devices 13 . . . 13 to open the gates 10a . . . 10a of the pool hoppers 10 . . . 10 situated above the empty weighing hoppers.

The arrangement is such that when the outwardly opening gates 12b . . . 12b of weighing hoppers associated with the selected weighing machines 11 . . . 11 in the left section 15a of the collecting chute 15 open, the inwardly opening gates 12a . . . 12a of the weighing hoppers associated wh the selected weighing machines 11 . . . 11 in the right section 15b will also open. Further, at the next discharge cycle, the inwardly opening gates 12a . . . 12a of weighing hoppers associated with the selected weighing machines 11 . . . 11 in the left section 15a of the collecting chute 15, and the outwardly opening gates 12b . . . 12b of the weighing hoppers associated with the selected weighing machines 11 . . . 11 in the right section 15b, will open. Accordingly, at the first discharge cycle, weighed articles pass through the first discharge route I by flowing into the left discharge portion 18a from both the outer receiving portion 17 (left-half section 17a) in the left section 15a and the inner receiving portion 16 (right-half section 16b) in the right section 15b. At the next discharge cycle, weighed articles pass through the second discharge route II by flowing into the right discharge portion 18b from both the outer receiving portion 17 (right-half section 17b) in the right section 15b and the inner receiving portion 16 (left-half section 16a) in the left section 15a. Thus, weighed articles are supplied to a packaging machine at the end of each weighing cycle by passing through the first and second disarge routes I, II alternatingly.

The foregoing description relates to a so-called continuous weighing system wherein the weighing cycles are performed in a continuous manner, each cycle comprising steps of supplying the weighing machines with articles to be weighed, weighing the articles, computing combinations, discharging articles and then returning to the supply step. However, the collecting chute of the invention having the above-described construction can also be applied, without modification, to a so-called single-supply two-computation weighing system which operates by supplying articles to all of the weighing machines, computing two suitable combinations, and simultaneously discharging the articles belonging to one of the two combinations into one of the two discharge routes of the collecting chute and the articles belonging to the other combination into the other discharge route, thereby delivering the two batches of articles to two awaiting packaging machines.

Therefore, weighed articles obtained from the weighing system main body 1 each time a weighing operation is performed will not mix within the collecting chute 15. Thus, the weighed article batches can be separated reliably and supplied to a packaging machine at twice the processing capacity of a collecting chute having only one discharge route. In addition, since the discharge routes I, II have left-right symmetry, the weighed articles pass through both routes in approximately the same length of time, allowing the articles to be delivered to the packaging machine at an interval equivalent to the time interval between weighing operations performed by the weighing system. Consequently, unlike the prior-art arrangement having two discharge passages, there is no loss time which results from setting the weighing time interval to the maximum time required for passage of the articles through the longest discharge route.

Thus, in accordance with the collecting chute of the present invention as described hereinabove, weighed articles discharged by successive weighing operations will not mix even if the article discharge time interval is made very short. In addition, these articles can be supplied to a packaging machine or the like at a time interval equivalent to the discharge time interval. This makes it possible to raise, per unit of time, the processing capacity of such an automatic weighing system. Further, since the collecting chute of the present invention is composed of a number of assembled component parts, the chute can be readily detached from and reattached to the weighing system main body and disassembled to facilitate cleaning.

As many apparently widely different embodiments of the present invention can be made without departing from the spirit and scope thereof, it is to be understood that the invention is not limited to the specific embodiments thereof except as defined in the appended claims.

What I claim is:

1. A collecting chute for collecting weighed articles discharged from an automatic weighing system having a plurality of hoppers arrayed in a circle above the collecting chute, said hoppers having inwardly and outwardly opening gates, comprising:
   left and right upper, outer chutes, each upper, outer chute having a lower end portion, being of a substantially semicircular shape, including a plurality of detachably connected components, and forming respective halves of an outer article receiving portion;
   left and right upper, inner chutes disposed within and detachably connected to respective ones of said left and right upper, outer chutes, each upper, inner chute having a lower end portion, being of a substantially semicircular shape, including a plurality of detachably connected components, and forming respective halves of an inner article receiving portion;
   left and right lower, outer chutes detachably connected to respective ones of said left and right upper, outer chutes, each lower, outer chute having an upper opening in communication with said lower end portions of said left and right upper, outer chutes, respectively, having a lower end portion, and being arranged to have confronting sides having an opening with first and second portions;
   left and right discharge chutes, each discharge chute having an upper opening in communication with said lower end portions of said left and right lower, outer chutes, respectively, and forming first and second article discharge portions, respectively.

2. The collecting chute according to claim 1, wherein said left and right upper, outer chutes, said left and right lower, outer chutes, said left and right upper, inner chutes, said left and right lower, inner chutes and said left and right discharge chutes may be disassembled from one another.

3. A collecting chute according to claim 1, wherein said chute has a substantially inverted conical shape.

4. An apparatus for collecting articles, comprising:
   a first collecting chute including:
      a first upper, outer chute having a lower end portion and including a plurality of detachably connected chute components,
      a first upper, inner chute, disposed within and detachably connected to said first upper, outer chute, having a lower end portion and including a plurality of detachably connected components,
      a first lower, outer chute detachably connected to said first upper outer chute, having an upper opening in communication with said lower end portion of said first upper, outer chute, a through hole having first and second portions and a discharge opening,
      a first lower, inner chute, disposed within and connected to said first lower, outer chute, having an upper opening in communication with said lower end portion of said first upper, inner chute and an outlet in commnication with said first portion of said through hole of said first lower, outer chute;
   a second collecting chute including:
      a second upper, outer chute having a lower end portion and including a plurality of detachably connected chute components,
      a second upper, inner chute, disposed within and detachably connected to said second upper, outer chute, having a lower end portion and including a plurality of detachably connected chute components,
      a second lower, outer chute detachably connected to said first upper, outer chute, having an upper opening in communication with said lower end portion of said second upper, outer chute, a through hole having first and second portions in communication with said second and first portions of said through hole of said first lower, outer chute, respectively, and a discharge opening,
      a second lower, inner chute, disposed within and connected to said second lower, outer chute, having an upper opening in communication with said lower end portion of said second upper inner chute and an outlet in communication with said first portion of said through hole of said second lower, outer chute;
   a first discharge chute having an upper opening in communication with said discharge opening of said first lower, outer chute; and
   a second discharge chute having an upper opening in communication with said discharge opening of said second lower, outer chute.

5. An apparatus according to claim 4, wherein said first and second upper, outer chutes, said first and second upper, inner chutes, said first and second lower outer chutes and said first and second lower, inner chutes have an inverted, bisected frusto-conical shape so that said first and second collecting chutes have an inverted, bisected frusto-conical shape, and wherein said first and second collecting chutes are connected so as to form an inverted frustum.

6. An apparatus for collecting articles, comprising:
   left and right upper, outer chute semi-assemblies, each upper, outer chute semi-assembly having a lower end portion, being of substantially semicircular shape, and including a plurality of detachably connected outer chute components, each outer chute component having a first engaging member;

left and right upper, inner chute semi-assemblies respectively disposed within the left and right upper outer chute semi-assemblies, each upper, inner chute semi-assembly having a lower end portion, being of substantially semicircular shape, and including a plurality of detachably connected inner chute components, each inner chute component having a second engaging member for engaging with the first engaging members of the first outer chute components;

left and right lower, outer chutes, each lower, outer chute having an upper opening in communication with the lower end portions of the left and right upper, outer chutes, respectively, a lower end portion forming a through-hole, a confronting side having an opening with first and second portions, and a cross beam disposed above the opening;

left and right lower, inner chutes, removably disposed within said left and right lower, outer chutes, respectively, each lower, inner chute having an upper opening in communication with said lower end portions of the left and right upper, inner chutes, respectively, an outlet in communication with the first portion of the opening of the right and left lower, outer chutes, respectively, and a third engaging member for engaging with the cross beams of the left and right lower, outer chutes, respectively; and left and right discharge chutes, each discharge chute having an upper opening in communication with the lower end portions of the left and right lower, outer chutes, respectively, and forming first and second article discharge portions, respectively.

7. An apparatus for collecting articles according to claim 6, wherein the apparatus has a substantially inverted conical shape.

* * * * *

UNITED STATES PATENT AND TRADEMARK OFFICE
CERTIFICATE OF CORRECTION

PATENT NO. : 4,602,709

DATED : July 29, 1986

INVENTOR(S) : Ueda

It is certified that error appears in the above-identified patent and that said Letters Patent is hereby corrected as shown below:

Col. 4, line 49, "our" should be --outer--.

Col. 6, line 43, "disarge" should be --discharge--.

Col. 9, line 9, after "of" insert --a--.

Signed and Sealed this

Eighteenth Day of November, 1986

Attest:

DONALD J. QUIGG

*Attesting Officer*  *Commissioner of Patents and Trademarks*